US006860953B1

(12) United States Patent
Grizzle et al.

(10) Patent No.: US 6,860,953 B1
(45) Date of Patent: Mar. 1, 2005

(54) PROCESS FOR MANUFACTURING A FLOOR COVERING HAVING A FOAMED BACKING FORMED FROM RECYCLED POLYMERIC MATERIAL

(75) Inventors: Mark L. Grizzle, Whitfield County, GA (US); Lynn E. Preston, Bartow County, GA (US); Wallace J. Hammel, Chatanooga, TN (US); Brian S. Randall, Calhoun, GA (US); Paul D. Evans, Jr., Dalton, GA (US)

(73) Assignee: Collins & Aikman Floorcoverings, Inc., Dalton, GA (US)

( * ) Notice: Subject to any disclaimer, the term of this patent is extended or adjusted under 35 U.S.C. 154(b) by 12 days.

(21) Appl. No.: 09/621,591

(22) Filed: Jul. 21, 2000

Related U.S. Application Data

(63) Continuation-in-part of application No. 09/039,913, filed on Mar. 16, 1998, now abandoned, which is a continuation-in-part of application No. 08/826,431, filed on Mar. 18, 1997, now Pat. No. 5,855,981, which is a continuation of application No. 08/517,230, filed on Aug. 21, 1995, now abandoned.

(51) Int. Cl.[7] .................. B32B 31/00; B32B 31/04; B32B 5/18; B32B 5/20; B32B 5/22
(52) U.S. Cl. .................. 156/72; 156/77; 156/78; 156/79; 428/95; 428/903.3; 264/37.3; 264/37.32; 264/45.1; 264/45.3
(58) Field of Search .................. 428/95, 96, 327, 428/903.3; 156/72, 77, 78, 79; 264/37.1, 37.3, 37.32, 45.1, 45.3, 140

(56) References Cited

U.S. PATENT DOCUMENTS 3,014,829 A 12/1961 Curtin
3,334,153 A 8/1967 Fukushima et al.

(List continued on next page.)

FOREIGN PATENT DOCUMENTS

| CA | 2080259 | 4/1993 | |
|---|---|---|---|
| DE | 2425751 | 12/1975 | |
| DE | 2425751 A | * 12/1975 | ............. B29B/1/02 |
| DE | 3816894 A | * 11/1989 | ........... C04B/18/04 |
| DE | 4014012 | 10/1991 | |

(List continued on next page.)

OTHER PUBLICATIONS

Malloy et al., Presentation at Spring National Meeting, Mar. 29, 1992, Session 24, pp. 1–10.
Hagsberg et al., "Recycling Nylon Carpet Via Reactive Extrusion", *Plastics Engineering*, Apr. 1997, pp. 41–43.
Kumar, "Carpet Recycling Technologies", *Book of Papers*, 1997 International Conference & Exhibition, pp. 220–228.
Schnell, "Material Recycyling of Textile Floor Coverings", *International Polymer Science and Technology*, vol. 21, No. 3, 1994, pp. T/1–T/9.

(List continued on next page.)

*Primary Examiner*—Cheryl A. Juska
(74) *Attorney, Agent, or Firm*—Womble Carlyle Sandridge & Rice, PLLC

(57) ABSTRACT

The present invention provides a cushioned floor covering having a backing material formed from waste polymeric material and a blowing agent wherein the blowing agent may be activated either before or after the backing material is adhered to the floor covering. The waste polymeric material includes from about 0 to 40 percent aliphatic polyamide material and is granulated, densified and extruded at a temperature that does not exceed the temperature at which the blowing agent would be activated.

21 Claims, 8 Drawing Sheets

U.S. PATENT DOCUMENTS

| | | | |
|---|---|---|---|
| 3,551,231 A | | 12/1970 | Smedberg |
| 3,560,284 A | | 2/1971 | Wisotzky et al. |
| 3,654,219 A | | 4/1972 | Boyer et al. |
| 3,658,752 A | | 4/1972 | Mogadore et al. |
| 3,661,691 A | | 5/1972 | Slosberg |
| 3,695,987 A | | 10/1972 | Wisotzky et al. |
| 3,698,973 A | | 10/1972 | Wisotzky et al. |
| 3,704,197 A | | 11/1972 | Bahlo |
| 3,728,182 A | | 4/1973 | Wisotzky et al. |
| 3,922,464 A | | 11/1975 | Silver et al. |
| 4,003,866 A | | 1/1977 | Paturle |
| 4,028,159 A | | 6/1977 | Norris |
| 4,029,839 A | * | 6/1977 | Lesti ..................... 428/317.9 |
| 4,105,593 A | | 8/1978 | Stavrinou |
| 4,105,709 A | | 8/1978 | Iwami et al. |
| 4,158,646 A | | 6/1979 | Benkowski et al. |
| 4,250,222 A | | 2/1981 | Mavel et al. |
| 4,260,568 A | * | 4/1981 | Warzel ..................... 264/37 |
| 4,284,681 A | | 8/1981 | Tidmarsh et al. |
| 4,359,556 A | | 11/1982 | Lakshmanan et al. |
| 4,371,576 A | | 2/1983 | Machell |
| 4,437,918 A | | 3/1984 | Morohashi et al. |
| 4,617,210 A | | 10/1986 | Zybko |
| 4,656,074 A | | 4/1987 | Conley et al. |
| 4,808,459 A | | 2/1989 | Smith et al. |
| 4,849,267 A | | 7/1989 | Ward et al. |
| 4,870,110 A | | 9/1989 | Mehra et al. |
| 4,877,827 A | | 10/1989 | Van Der Groep |
| 4,968,463 A | | 11/1990 | Levasseur |
| 4,988,764 A | | 1/1991 | Nishio et al. |
| 5,010,138 A | | 4/1991 | Westeppe et al. |
| 5,112,908 A | | 5/1992 | Epstein |
| 5,122,404 A | | 6/1992 | Fowler |
| 5,122,569 A | | 6/1992 | Scheibelhoffer et al. |
| 5,217,655 A | | 6/1993 | Schmidt |
| 5,240,530 A | | 8/1993 | Fink ........................ 156/94 |
| 5,288,349 A | | 2/1994 | Fink ........................ 156/72 |
| 5,294,384 A | | 3/1994 | David et al. |
| 5,324,562 A | | 6/1994 | Mullinax et al. |
| 5,505,999 A | * | 4/1996 | Krishnan et al. ........ 427/389.9 |
| 5,518,188 A | | 5/1996 | Sharer |
| 5,535,945 A | | 7/1996 | Sferrazza et al. |
| 5,560,797 A | | 10/1996 | Burt et al. |
| 5,578,357 A | | 11/1996 | Fink ........................ 428/95 |
| 5,578,648 A | | 11/1996 | Beyer et al. |
| 5,598,980 A | | 2/1997 | Dilly-Louis et al. |
| 5,604,025 A | | 2/1997 | Tesch |
| 5,626,939 A | * | 5/1997 | Kotlair et al. ............ 428/97 |
| 5,719,198 A | * | 2/1998 | Young et al. ............ 521/40.5 |
| 5,728,444 A | | 3/1998 | Fink ........................ 428/97 |
| 5,852,115 A | | 12/1998 | Young et al. |
| 6,051,300 A | | 4/2000 | Fink ........................ 428/95 |
| 6,241,168 B1 | * | 6/2001 | Young et al. ............ 241/23 |
| 6,306,318 B1 | * | 10/2001 | Ricciardelli et al. ..... 264/37.32 |
| 6,316,075 B1 | | 11/2001 | Desai et al. |
| 6,786,988 B1 | * | 9/2004 | Bell ........................ 156/72 |
| 2003/0075824 A1 | * | 4/2003 | Moore et al. ............ 264/143 |
| 2004/0062903 A1 | * | 4/2004 | Evans et al. ............. 428/95 |

FOREIGN PATENT DOCUMENTS

| | | | | |
|---|---|---|---|---|
| DE | 4311708 A1 | * | 10/1994 | ........... B29C/47/40 |
| DE | 19540366 A1 | * | 5/1997 | ........... B29B/17/00 |
| EP | 511469 | | 11/1992 | |
| EP | 590189 | | 4/1994 | |
| GB | 2049540 | | 12/1980 | |
| JP | 60107309 A | * | 6/1985 | ........... B29B/17/00 |
| JP | 60109806 A | * | 6/1985 | ........... B29B/17/00 |
| JP | 206868 | | 10/1985 | |
| JP | 60-206868 | * | 10/1985 | |
| JP | 60219016 A | * | 11/1985 | ........... B29B/17/00 |
| JP | 3239754 | | 10/1991 | |
| JP | 04094216 A | * | 3/1992 | ........... H03K/23/00 |
| JP | 07052222 A | * | 2/1995 | ........... B29C/47/00 |
| JP | 11105096 A | * | 4/1999 | ........... B29B/17/00 |
| JP | 11105098 A | * | 4/1999 | ........... B29B/17/00 |
| KR | 2001066184 A | * | 7/2001 | ........... B29B/17/00 |
| KR | 2002081960 A | * | 10/2002 | ........... B29B/17/00 |
| RU | 1058978 | | 12/1983 | |
| WO | 9319654 | | 10/1993 | |

OTHER PUBLICATIONS

Schnell, "Material Recycling of Textile Flooring" *International Polymer Science and Technology*, vol. 21, No. 2, 1994, pp. T1–T4.

*Research Disclosure—August 1996*, No. 38813, "Separation Process", p. 474.

Laser, "Recycling Opportunities for Unitary Car Carpeting Systems", *Translation of Melliand Textilberichte*, vol. 74, 1993, pp. 205–206.

Abstract: 1941417 95W–01542, "Automobile Carpet Backing", 1994, p. 1.

Abstract: 1937670 94W–03844, "Polypropylene Carpet Backing for Cars", 1994. p. 1.

Abstract: 193768 94W–02942, "Structure of the Carpet and Automotive Textile Market Taking into Consideration the Environmental Considerations", 1993, p. 1.

Abstract: 1938079 94W–04253, "Non Woven Carpet Backing—Issues and Trends", 1994, p. 1.

Abstract: 1951309 94W–04233, "Method of Manufacturing a Recyclable Carpet", 1996, p. 1.

Abstract: 194589 94W–05614, "20 Years of Lutradur Polyester Spunbond Backing", 1994, p. 1.

Abstract: 1944861 95W–004986, "Unmixed Polymer Stitch–Bonded Fabrics for Effective Recycling Solutions", 1994, p. 1.

Abstract: 1946395 95W–06520, "Recycling of Polyproplyene Carpeting Waste. I. Feasibility Study", 1995. p. 1.

Abstract: 1948151 96W–01075, "Recycling of Polyproplyene Carpeting Waste. II. Commercialization of processes", 1995, p. 1.

Abstract: 1943365 95W–03490, "Recycling of Polypropylene Carpeting Waste. I. A Feasibility Study", 1994, p. 1.

Abstract: 1944572 95W–04697, Recycling of Carpeting and Disposables Wastes. II. Commercialization of Processes, 1995, p. 1.

Abstract: 1921814 92W–01086, "Multilayer Polypropylene Floor Covering for Automobiles", 1991, p. 1.

Abstract: 1995:668253, "Compatiblization of Automotive Carpet Scrap", p. 1.

Abstract: 1995:459031, "Sound Emission Analysis for Characterizing Fiber/Polymer Mixtures", p. 1.

Abstract: 1995:81263, "Material Recycling of Textile Flooring", p. 1.

Abstract: 1993:497802, "Recycling Opportunities for Unitary Car Carpeting Systems", p. 1.

Abstract: 1996:500029, "Innovative Products from Post Consumer Nylon Carpet Vin Reactive Extrusion", p. 1.

Abstract: 97:1249, "Status on the Recycling Automotive Carpeting", p. 1.

Abstract: 96:2257, "Development of Mechanical and Chemical Recycling Processing for Automotive Plastics Parts", p. 1.

Abstract: 94:12208, "Recycling Technology of Automotive Plastic Parts", p. 1.

Abstract: 1996:535287, "Separation Process [for carpets]", p. 1.
Abstract: 1997:122403, "Properties and Applications of Recycled Polyamides", p. 1.
Abstract: 1992: 175994, "A Polypropylene Sandwich for Car Floors", p. 1.
Abstract: R:580203, "Automotive Polymer Recycling", 1995, p. 1.
Abstract: 97(12):3806, "Use of Post–Consumer Carpet Products During Landfill Management of Solid Wastes", p. 1.
Abstract: 79(10):523, "Textile Reclamation in Britain: Some Recent Impacts on a Traditional Industry", 1978, p. 1.
Abstract: 76(7):4423, "New Markets Grow Fast in PP Fibre", 1976, p. 1.
Abstract: 1996:506060, "Manufacture of Multilayer, Automobile Floor Covering with Layers Separable for Recycling", p. 1.
Abstract: 1997:101669, "Improvements in Reclaiming of Natural and Synthetic Rubbers", p. 1.
Abstract: 1995:863364, "Recycling of Carpet Scrap", p. 1–2.
Abstract: 1979:24935, "Reclaiming Waste Sheet Flooring", p. 1.
Abstract: 1993627933, "Extractionof Pure Polymeric Components from Multicomponent Textile Waste Using Supercritical Fluid Method", p. 1.
Abstract: 1994:137055, "Fully Recyclable Tufted Carpet from Single Class of Thermoplastic Polymers", p. 1.
Abstract: 1994:702610, "Polyamide Recovery fron Polyamide Products by Extraction", p. 1.
Abstract: 1994:219779, "Separation of Nylong 6 from Mixtures with Nylon 66", p. 1.
Abstract: 1997:88666, "Polyurthane–based Recyclable Floor Coverings", p. 1.
Abstract: 1996:434925, "Biodegradable Solvent for Separation of Rubber Latex from Solid Surfaces, Especially Carpets", p. 1.
Abstract: 1996:222487, "Process for Combined Working Up to PVC and Other Chlorinated Hydrocarbons", p. 1.
Abstract: 1995:963641, "Recovery of caprolactam from Mylon 6 Waste Carpets", p. 1.
Abstract: 1996: 504123, "Resuable Textile Floor Coverings for Automobiles", p. 1.
Abstract: 95–245758, "Aliphatic Polyamide Recovery from Waste Materials", p. 1.
Abstract: 96–300678, "Recyclable Laminated Textile Floor Covering for Vehicles", p. 1.
Abstract: 95–115413, "Mainly Homogeneous Thermoplastic Polymer Blend Made from Carpet Scrap", p. 1.
Abstract: 95–075264, "Recyclable Carpets", p. 1–2.
Abstract: 94–325963, "Thermo Formable Composite Article . . . ", p. 1.
Abstract: 96–258770, "Carpet Fibrous and Backing Components Recycling for High Quality—by Shredding, Granulating, Sepg. and Returning Polyethylene Backing Material to Moulding Unit, for Moulding Automotive", p. 1.
Abstract: 97–054327, "Recyclable Floor Carpeting for Cars . . . ", p. 1.
Abstract: 97–036125, "Process for Reclaiming Elastomer from Sulphur Cured Material which can be Directly Used in Moulded Goods . . .", p. 1.
Abstract: 1996:363563, "Improved Carpet Reclaimation Process", p. 1.
Abstract: 96–200899, "Carpet Reclamation Process", p. 1.
Abstract: 96–159732, "Formation of Thermoplastic Compsn. from Used Carpet . . . ", p. 1.
Abstract: 94–091484, "Process for Prouducing Thermoplastic Composition by Melt Blending Carpet", p. 1.
Abstract: 97–154195, "Recovery of Monomer from Multicomponent Polymer Waste", p. 1.
Abstract: 94–034390, "Separation of Nylon 6 from Mixtures with Nylon 6.6 . . . ", p. 1.
Abstract: 93–197789, "Tufted Carpets Capable of Being Completely Recycled", p. 1.
Abstract: 93–319537, "Recycling Polymeric Carpet Component—Using Supercritical Fluid at Different Temperatures and Pressures to Dissolve and Extract Each Component in Turn", p. 1.
Abstract: 96–159413, "System for Reclaiming and Recycling Waste Carpet materials in Carpet Production", p. 1.
Abstract: 97–152551, "Process for Recovign Caprolactam from Contaminated Polyamide–6 by Hydrolyne Depolymerisation with Water at Elevated Temperatures Extracting from the Resulting Aq. Solution Using Alkylphenol and Recovering from the extract by Distn.", p. 1.
Abstract: 97–147508, "Recycling Polyamide–Contg. Carpet Waste by Extn. with an Agent Containing an Aliphatic Alcohol", p. 1.
Abstract: 97–086670, "Thermoplastic Melt Blend Obtd. from Non–sepd. Used Carpet Sampels", p. 1.
Abstract: 97–023190, "Tufted Carpet which can be Recycled by Sepn. of Compnents . . . ", p. 1.
Abstract: 96–420398, "Even Wide–area Recyclable Carpet which is Removable with Unwished Residues", p. 1.
Abstract: 96–341182, "Recovery of Polymeric Fibres Esp. Nylong from Tufted Carpeting", p. 1.
Abstract: 95–384118, "Separating Components of Carpet Material for Recycling by Milling, Suspending in Water, Adjusting Liquid Density with Salt Solution and Separating on the Basis of Density in a Special Centrifuge", p. 1.
Abstract: 1995:324834, "Reclaiming Epsilon–Caprolactam from Carpet Waste", p. 1.
Abstract: 95–008025, "Reclaiming and Purification of Epsilon–Caprolactam from Carpet Waste", p. 1.
Abstract: 94–317799, "Recycling Plastic Containing Bonded Fabrics", p. 1.
Abstract: 94–036050, "Elastic Back Layer Production for Carpet for Improved Consistency by using Carpet . . . ", p. 1.
Abstract: 93–206478, "Carpet Waste Recycling Involves Washing Ground Fine Fibre Waste to be Converted into Bonded Nonwoven Felting", p. 1.
Abstract: 92–416422, "Flat Composite for Car Components with Thermoplastic Matrix Containing Recycled Carpet, Backing, Polypropylene and Polyamide and with Glass Fibre Reinforcement", p. 1.
Abstract: 92–367348, "Textile Flat Reusable Odourless Mateiral", p. 1.
Abstract: 89–357377, "Recovered Material Car Carpet Waste is Produced by Reducing Waste Stips to Coarse Porous Particles, mixing with Polylurethane Reagents, Extruding Heating to Cure", p. 1.
Abstract: 79–86374A, "Thermoplastic Fibre Carpet, Waste Recovery—Effected by Shredding Wate into Pieces, Laying in Layers, Heating above m. pt., Pressing and Cooling", p. 1.

Abstract: 1996:537332, "Hot–press Moldings from Recycled Scraps from Automobile Floor Carpets", p. 1.
Abstract: 1996:345860, "Recyclingn of Solid Waste", p. 1.
Abstract: 1995:640756, "Manufacture of Automobile Interior Flexible Composite Sheet from Polypropylene Carpet Remnant", p. 1.
Abstract: 1994:633039, "Manufacture of Synthetic Fiber Felts as Backings for Automobile Carpets", p. 1.
Abstract: 1994:536373, "Recyclable Automobile Carpets", p. 1.
Abstract: 1986:70229, "Recycling of Carpet Scraps", p. 1.
Abstract: 1997:2939, "Sound–insulating Felt Backing for Carpets with Ultra Low Density", p. 1.
Abstract: 1996546102, "Adhering Sound Insulation Sheets to Vehicular Floor Carptes", p. 1.
Abstract: 1996:434783, "Polyester–based Fibre Products with Recyclability", p. 1.
Abstract: 1995:748880, "Chip Moldings Adhering to Surface Materials without Adhesives and Manufacture thereof for Automotive Interiors", p. 1.
Abstract: 1994:166001, "Manufacture of Thermoplastic Polymer from Recycled Fibrous Structures", p. 1.
Abstract: 1994:166001, "Manufuacture of Thermoplastic Polymer Compositions from Recycled Fibrous Structures", p. 1–2.
Abstract: 1994:137067, "Sound and Heat Insulating Two–layered Felt Backings for Carpets for Automobiles", p. 1.
Abstract: 1990:633063, "Manufacture of Fire–retardent Recycled Polyurethane Foam Moldings", p. 1.

Abstract: 90–275014, "Flame Retardant re Bonded Polyurethane Foam Prodn. Using Foam Chips Mixed with Thermally Expansible Graphite", p. 1.
Abstract: 1983:439508, "Sound–insulating Lamintaes for Automobile Interiors", p. 1–2.
Abstract: 1983:406628, "Sound–insulating Automobile Floor Linings", p. 1–2.
Abstract: 1997:55981, "Recyclable Pile Carpets with Easy Peeling of Carpet Base Layer from Binder Layer and Recycling Thereof with High Recovery of Pile Fibrer", p. 1.
Abstract: 1996:248072, "Carpets and Floor Covering Materials Consisting of Plastic Backing. Coating and Pile, and their Manufacture and Recycling", p. 1.
Abstract: 94:192285, "Bonded Fibre Mixed Yarn Based on Wool and Opt. Other Carpet Fibre with Melt Bonding Fibre and Use in Woven or Knitted Textile, Exp. Wall Covering or Carpet to Increase Yarn Structure Retention", p. 1.
Abstract: 1995:986429, "Molding of Chips and Sound Insulators Therefrom", p. 1.
Abstract: 1993:627945, "Manufacture of Fibers Recycled Polyester Wastes", p. 1.
Abstract: 1984:140517, "Automobile Floor Coverings", p. 1.
Abstract: 1983:596761, "Automobile Carpet Backing", p. 1.
Abstract: 1983:506481, "Polyurethane–containing Sound Insulating Sheets", p. 1.

* cited by examiner

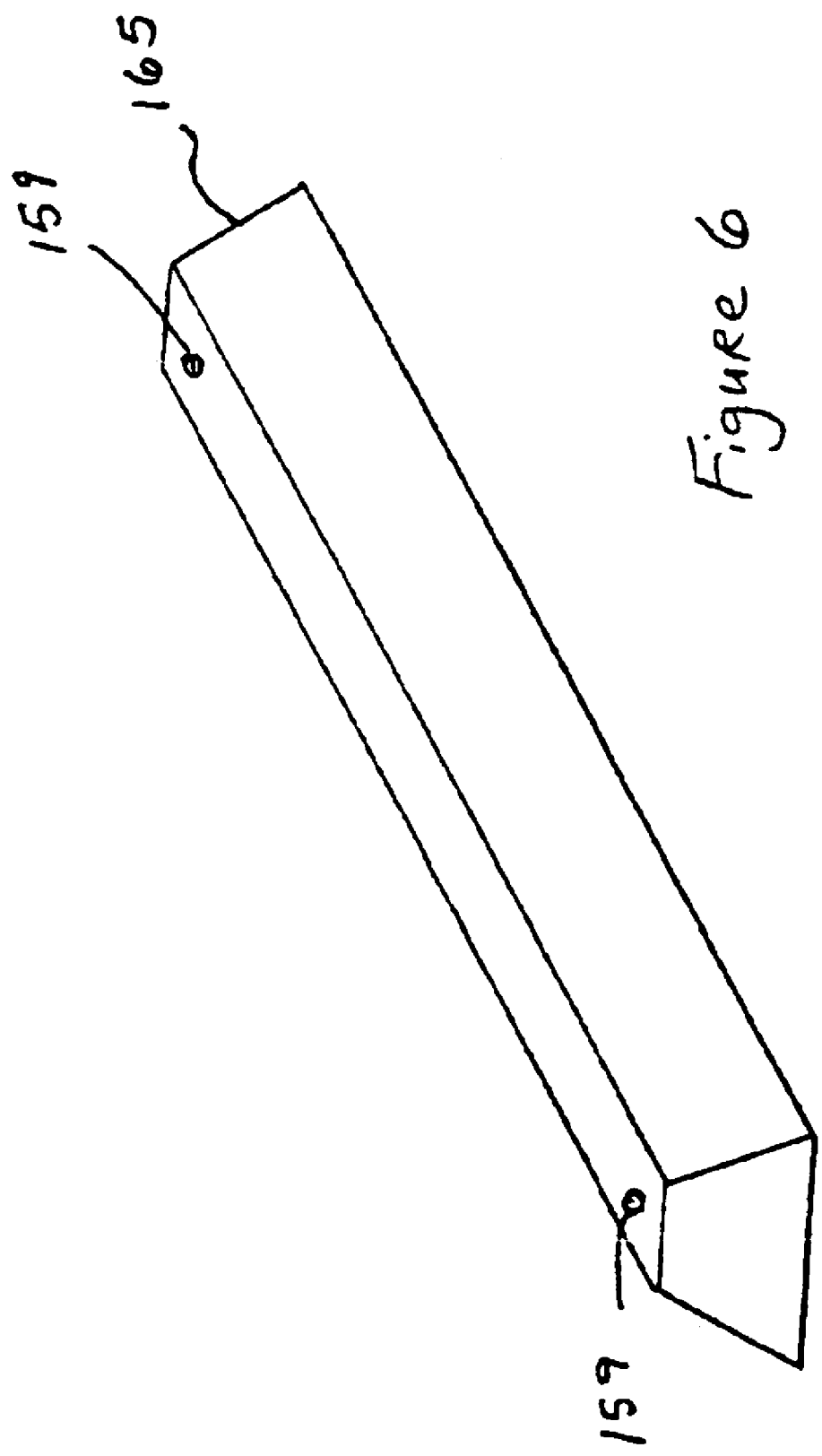

PROCESS FOR MANUFACTURING A FLOOR COVERING HAVING A FOAMED BACKING FORMED FROM RECYCLED POLYMERIC MATERIAL

RELATED APPLICATIONS

This is a continuation-in-part of prior application Ser. No. 09/039,913 filed Mar. 16, 1998; now abandoned which is a continuation-in-part of prior application Ser. No. 08/826,431, filed Mar. 18, 1997, now U.S. Pat. No. 5,855,981 issued Jan. 5, 1999, which is a continuation of prior application Ser. No. 08/517,230 filed Aug. 21, 1995, now abandoned, and is also related to U.S. Pat. No. 5,914,353 issued Jun. 22, 1999, which was a continuation-in-part of U.S. Pat. No. 5,728,741 issued on Mar. 17, 1998, which was a continuation of prior application Ser. No. 08/517,571 filed on Aug. 21, 1995, now abandoned, all of which are continuations of prior application Ser. No. 08/193,801 filed Feb. 9, 1994, now abandoned, the disclosures of which are incorporated herein in their entirety.

BACKGROUND AND FIELD OF THE INVENTION

The present invention relates to recycling and reclaiming waste polymeric material, and forming an article therefrom, and more particularly forming a floor covering utilizing the recycled and reclaimed waste polymeric material.

There has been an increased interest in recycling, reclaiming and reutilizing waste and scrap material, and particularly waste thermoplastic polymeric material from a variety of sources. The recycling of most mixtures of thermoplastic scrap material is limited by the incompatibility of the various different kinds of thermoplastic and non-thermoplastic material present in the scrap. For example, the various thermoplastic resins are often insoluble in each other resulting in a heterogeneous mixture in which each type of resin forms a dispersed phase in the other. This often adversely affects the mechanical properties (e.g. tensile and impact strength) and aesthetic properties of any articles formed from such a mixture.

One suggestion to overcome this problem is to sort the scrap material based on the specific thermoplastic material present. Such sorting, however, is often impractical from both a technical and economic standpoint. Thus, various other solutions have been proposed with respect to recycling waste polymeric material. For example, U.S. Pat. No. 4,250,222 to Mavel et al. proposes coarsely grinding a mixture of two or more mutually incompatible thermoplastic resins, incorporating into the coarsely ground thermoplastic resin mixture, through the application of heat and pressure, from about 5 to about 25 parts of weight of a fibrous material, and forming the resin/fiber mass into an article.

U.S. Pat. No. 4,968,462 to Levasseur proposes shredding or granulating polymeric waste, drying the material to a water content of not more than 8% by weight, preheating the material to a temperature of 80° C. to 160° C., kneading at a temperature of 120° C. to 250° C. and injection molding or extruding the material to form a product such as a fence post.

Processes for recycling floor covering have also been desired inasmuch as a particularly large amount of scrap material is generated during the manufacture of floor covering. For example, in the manufacture of tufted carpet, the tufted carpet may have nylon pile secured in a primary backing of a woven polypropylene fabric, which has a secondary vinyl plastic backing. The pile, the primary backing and secondary backing are typically each a thermoplastic having different characteristics.

Specific to recycling carpet, U.S. Pat. No. 4,028,159 to Norris proposes a process for reclaiming selvedge formed during manufacturing. The process comprises heating the selvedge in air to a temperature above the melting points of the resins to melt and degrade the resins; separating melted resin from solid residue to reclaim meltable resin from the selvedge; and utilizing the reclaimed resins as a substitute for at least a portion of the high molecular weight resins in an adhesive mixture in subsequent carpet production.

U.S. Pat. No. 4,158,645 to Benkowski et al. proposes applying a shearing force (e.g., using a Banbury mixer) to tear the fabric fibers into lengths no greater than about 0.25 inch. This forms a mixture of thermoplastic-resin and short lengths of fabric fibers. The resulting mixture is subjected to heat and pressure, such as by a drop mill and thus banded. After the mixture is banded, it can be calendared onto a web of fabric to form a finished reinforced sheet or extruded into various continuous forms such as sheets or strips. The process is described as being particularly useful as applied to scrap polyvinyl chloride sheet material reinforced with cotton fabric.

These processes of recycling or reclaiming scrap material, however, are not entirely successful and have not found widespread usage because of economic infeasibility and limitations on the types of article, which can be made. Thus, it is among the objects of the invention to provide an improved process of recycling, reclaiming, and reutilizing scrap material, and particularly thermoplastic scrap material from the manufacture of floor covering or the subsequent removal of the floor covering after installation.

It is another object of the present invention to provide a new floor covering using the recycled and reclaimed scrap material. This new floor covering would include both carpet tiles and roll goods of either woven or tufted construction of varying widths having a secondary backing comprised primarily of the recycled, reclaimed scrap material. The secondary backing could be made of a continuous solid phase material or a reduced density discontinuous phase where air or another dissimilar material is incorporated. The secondary backing could have a pressure sensitive adhesive layer for removably attaching the new floor covering to a floor.

It is yet another object of the present invention to provide a method of manufacturing a floor covering having a reduced density secondary backing formed from recycled and reclaimed scrap polymeric material.

A further object of the present application is to provide an article of manufacture made from an improved process of recycling, reclaiming, reutilizing and extruding scrap material, and particularly thermoplastic scrap material from the manufacture of floor covering or the subsequent removal of the floor covering after installation.

Another object of the present application is to provide building materials, car parking stops, highway guardrail offset blocks, mats, sea walls, sound barrier walls and other similar products made from the recycled and reclaimed scrap material. Other objects and advantages of this invention will become apparent from the following description taken in connection with the accompanying drawings wherein are set forth, by way of illustration and example, certain embodiments of this invention.

SUMMARY OF THE INVENTION

These and other objects and advantages of the present invention are accomplished by an extrusion process for recycling waste polymeric material comprising a mixture of waste polymeric material wherein the waste polymeric material may include from about 0 to 40 percent aliphatic polyamide or other materials; granulating the chopped mixture into fragments at least an order of magnitude smaller than the size of the waste polymeric material; densifying the granulated chopped mixture into fragments having a more uniform and solid consistency; and extruding the densified granulated mixture at a temperature of less than the temperature at which the components of the waste material decompose for making various articles of manufacture. The process of the present invention can also include a profile extrusion process that utilizes cooling water for cooling the extruded material to form a desired profile shape, a conveyor gripping motor for pulling the cooled extruded material into a cutting section for cutting the cooled extruded material into a desired size for making various articles of manufacture.

The present invention also provides for a floor covering. The floor covering described herein includes, but is not limited to, a carpet or tile having textile fibers defining a fibrous upper face which are tufted into a primary backing or a woven fibrous upper face and a secondary backing permanently adhered to the lower surface of the primary backing of the tufted articles or to the lower surface of the woven article, the secondary backing comprising a matrix formed by an extrusion recycling process that includes the steps of granulating a coarsely chopped mixture of waste polymer material including, but not limited to, 0 to 40 percent aliphatic polyamide material, densifying the granulated chopped mixture into fragments having a more uniform and solid consistency, extruding the densified granulated mixture at a temperature of less than the temperature at which the components of the waste material decompose and calendering the extruded granulated material to provide the secondary backing layer for a carpet or a tile. A low density discontinuous phase secondary backing layer can be achieved by the incorporation of an activated chemical blowing agent mixture or by the incorporation of a variety of lower density materials along with the densified granulated chopped mixture.

In an illustrative embodiment of the present invention, a process for manufacturing a backing material for a floor covering comprises chopping a mixture of waste polymeric material wherein the waste polymeric material has about 0.1 to 40 percent aliphatic polyamide material having a predetermined melting temperature. The chopped mixture is granulated into fragments that are smaller than the original size of the waste polymeric material. The process further comprises the steps of densifying the granulated mixture into pelletized waste polymeric material and mixing the waste polymeric material with a blowing agent having a predetermined decomposition temperature. The mixed waste polymeric material and blowing agent are then extruded at a temperature less than the melting temperature of the majority of the aliphatic polyamide material and less than the decomposition temperature of the blowing agent to form an extrudate. The extrudate is then calendered to form a backing sheet. The backing sheet is then adhered to the floor covering. The process also comprises the step of heating the backing sheet to a temperature above the decomposition temperature of the blowing agent, thereby causing the backing sheet to expand to form a cushioned backing layer.

Other useful products including, but not limited to, building materials, car parking stops and highway guardrail offset blocks are also provided. The process for producing these useful products, which are made from the densified recycled and reclaimed scrap materials, may include the use of a profile extrusion process and linear low-density polyethylene (LLDPE) or similar material. The extruded waste material is fed through an extrusion die, which can contain the shape of the desired article of manufacture to further define the final shape of the article of manufacture, is cooled by means of a continuous chilled water bath and upon exiting the chilled water bath is cut while in motion to the desired length or width. Further mechanical processing specific to the final article of manufacture, such as planing, sawing, or drilling may be desired.

BRIEF DESCRIPTION OF THE DRAWINGS

Some of the objects and advantages of the invention having been stated, other objects will appear as the description proceeds when taken in conjunction with the accompanying drawings in which:

FIG. 6 is a perspective view of a parking stop in accordance with the present invention.

DETAILED DESCRIPTION OF THE PREFERRED EMBODIMENT

While the present invention will be described more fully hereinafter with reference to the accompanying drawings in which particular embodiments of the invention are shown, it is to be understood at the outset that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
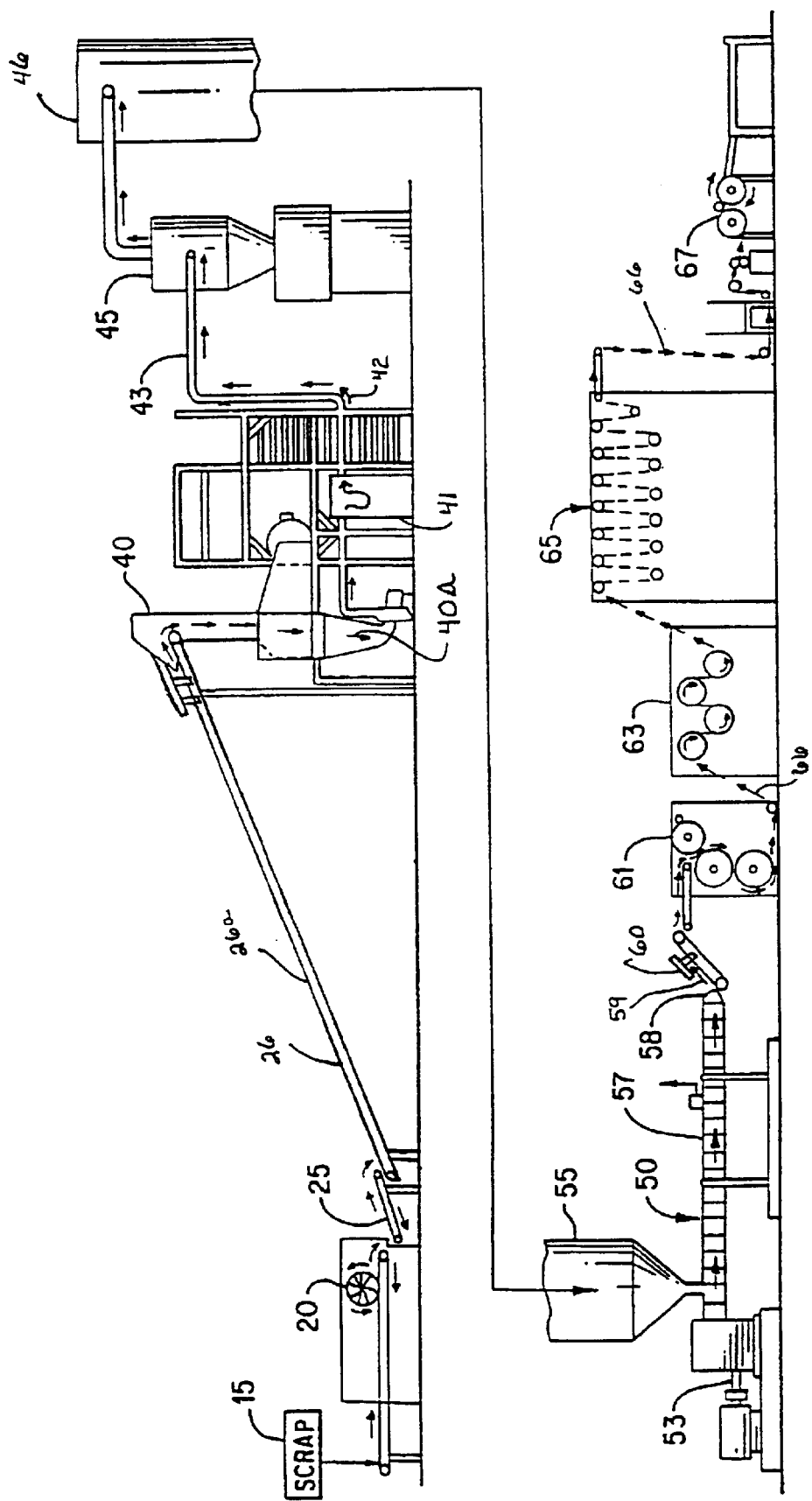
FIG. 1 is a diagrammatic view of the process for making products in accordance with the present invention.

A preferred form of the process is illustrated in FIG. 1 wherein waste polymeric material (scrap) 15, such as carpet remnants or carpet tiles, is delivered to a guillotine chopper 20. The waste polymeric material 15 typically comprises a wide variety of thermoplastic material generated during the manufacture of floor coverings and generated in the disposal of used floor coverings. Typical thermoplastic materials that may be present include aliphatic polyamides, polyolefins (e.g., polyethylene and polypropylene), polymers based on vinyl monomers (e.g., vinyl chloride and vinyl esters such as vinyl acetate), polymers based on acrylic monomers (e.g., acrylic acid, methyl acrylic acid, esters of these acids, and acrylonitrile), other thermoplastic polymers, and blends and copolymers thereof. The aliphatic polyamides that are present in the material 15 can range in the amount of about 0 to 40 percent of the total amount of material 15, but are normally approximately 12% of the total amount of material 15. The aliphatic polyamides add strength (stability) to the resulting recycled material 66, such that the aliphatic polyamides increase the tear resistance and breaking strength and decrease the elongation and shrinkage of the resulting recycled material 66. The term "aliphatic polyamide polymer" used herein and throughout the specification may include, but is not limited to, long-chain polymeric or copolymeric amide which has recurring amide groups as an integral part of the main polymer or copolymer chain, which may be in the form of a fiber. Examples of aliphatic polyamides can include nylon 6 or poly (ω-caprolactam); nylon 66 or poly (hexamethylenedia mine-adipic acid) amide; poly (hexamethylenediamine-sebacic acid) amide or nylon 610; and the like. The mixture that is used to produce the resulting recycled material 66 is designed to produce an article of manufacture that has flexible properties such that the article can be rolled or unrolled at room temperature and at colder temperatures.

The guillotine chopper 20 is any conventional guillotine chopper that coarsely chops the waste polymer material into ¾ to 1 inch in width portions. A suitable guillotine chopper is Model CT-60 available from Pieret, Inc. The chopped mixture 26a, which is free of most metal, is transported, for example, via conveyer belts 25 and 26 to a granulator 40, which grinds the one inch portions into fragments at least an order of magnitude smaller than the original size of waste polymeric material. Typically this is about ⅜ inch and smaller. A suitable granulator is Model 24-1 available from Cumberland Company.

The granulated mixture 40a is transported to a densifier 41. The densifier 41 is designed to heat, melt, and form or compact solid smaller pieces of the granulated mixture 40a such that the extruder 50 can produce a more uniform blend of the resulting recycled material 66. The densifier 41 increases the density of the granulated mixture 40a to form densified material 42 that will be fed to the extruder 50. With the use of the densifier 41, such as a Plastcompactor Pelletizer Model No. CV50, manufactured by HERBOLD ZERKLEINERUNGSTECHNIK GmbH, the density of the granulated material 40a is increased such that the output of the extruder 50 is increased from approximately 1,000 lbs. per hour to approximately 4,000 to 6,000 lbs. per hour. The densifier 41 blends the granulated material 40a, which can be in the form of a fluffy, fibrous material with solid polymeric particles to form the densified material 42 which is in the shape of semi-uniform pellets. The densifier 41 has an approximate volume densification ratio of 2:1 (original granulated material to densified material volume).

Optionally, if a finer material is required, the densified, pelletized material 42 can be sent via a conveyor to a cryogenic grinder (not shown) that uses liquid nitrogen to freeze and grind the densified, pelletized material 42 to form a hard cryogenically ground material 42A that is fed into the extruder 50. The ground material 42A is made up of particles that are typically on the order of 0.01–0.20 inches in diameter. These particles may be screened to remove particles larger than a desired limit.

Cryogenic grinding may also be used as an alternative to or as a precedent step to the densification of the granulated material 40a. Under this alternative, the granulated mixture 40a can be sent via a conveyor 26 to a cryogenic grinder (not shown). The cryogenically ground material can then be sent either to the densifier 41 or to the extruder 50.

The densified material 42 and/or the cryogenically ground material 42A is transported via air in a conduit 43 to a Gaylord loading station 45 and/or to a silo 46. If desired, fines, dust and/or fibers can be removed and separated from the densified material 42 and/or the cryogenically ground material 42A.

The densified material 42 and/or the cryogenically ground material 42A is then conveyed to the extruder hopper 55 which feeds the extruder 50. Additional recycled material such as granulated waste PVC may be added to the waste polymeric material 42 or 42A in the hopper.

A suitable extruder is Model 2DS-K 57M32 or ZSK-170 M 1750 10 G, both available from Werner & Pfleiderer. The extruder 50 includes a control means 53 (e.g., a motor gearbox) and a feeder 55 that is connected to the silo 46 and to additional feeding tubes for accepting different materials. A metal detection station, such as a magnet, is located at the entrance of the feeder 55. Control means 53 is provided to insure that the extruder 50 and feeder 55 act cooperatively to maintain a constant feed condition throughout the conveying zone to a zone comprising one or more kneading zones (not shown). The fed materials then pass through an extruder barrel 57 including a degassing or a vacuum zone and then through a pumping zone which forces the materials through a die 58. The pumping zone functions to develop sufficient throughput without creating intolerable back pressures and torque in the preceding zones or on the thrust bearings of the extruder 50. The extruder is operated at a temperature selected to not exceed the temperature at which the largest portion of polymer based vinyl monomers and blends and copolymers thereof of the waste material decompose, which is about 200° C. (390° F. to 400° F.). The extruder is also preferably operated at a temperature less than the melting temperature of the majority of the aliphatic polyamide material. As discussed in more detail below, if the fed materials include a blowing agent for foaming the resulting article, the extruder must be operated at a temperature below the decomposition temperature of the blowing agent. Typically, the extruder 50 is operated such that a melt temperature of 300° F. to 390° F. is maintained as the extruded blend 59 exits the die 58. The extruded blend 59 can pass through a metal detector 60 before being transported to a calender 61, where it is formed into a sheet of recycled material 66 and then cooled at a cooling station 63. The cooled recycled material 66 may be accumulated by an accumulator 65 and then rolled up at a collection station 67. The resulting recycled material 66 can be calendered to form a backing layer for a floor covering that is flexible and can be rolled or easily handled or moved. Alternatively, a sheet may be formed using a sheet die attachment in combination with the extruder 59 or a second extruder. If a sheet die is used, it is preferred that the recycled material 66 be formed from powdered waste polymeric material that has been cryoground in order to avoid clogging of the die.

Accordingly, exemplary articles of manufacture include secondary backings for floor coverings, components of other building material, such as sound barriers, roofing materials and the like.

The recycled material 66 can be reduced in density (i.e., foamed) by the addition of a chemical blowing agent, which when decomposed expands to form gas-filled cavities within the material. The reduction in density results in a foamed recycled material 66A having cushioning properties. Such properties are particularly advantageous when the foamed material 66A is used as a backing layer for a floor covering.

The resulting recycled material with cushion properties 66A is produced by adding a chemical blowing agent to the recycled material 66 and other additives into the feeder 55. Feeder 55 supplies these materials to the extruder 50. A pelletized azodicarbonamide blowing agent such as Blo-Foam PMA 50 from Rit Chem Company, Inc. can be used. The pellet is composed of 50% azo blowing agent (ADC 1200 grade) and 50% PVC and is therefore 50% active. The average particle size of the blowing agent is 5 microns, which correlates to the average diameter of the circular particle. The optimum particle size is approximately 3 to 4 microns. The decomposition temperature of the active azo ingredient, ADC 1200 is approximately 195° to 220° C. (383° to 428° F.), however, the effective decomposition temperature of the activated azodicarbonamide of the pellet ranges from 175° to 185° C. (347° to 365° F). Other blowing agents having decomposition temperatures as low as 325° F. may be used as long as the extrusion temperature is lower than the decomposition temperature. The gas volume resulting from decomposition of the azodicarbonamide is in the range of 85 to 115 ml/gram of azodicarbonamide. The blowing agent decomposes (i.e., is activated) at its corresponding decomposition temperature and releases gas. This release of gas produces a cell or gas pocket (referenced in FIG. 10 as 256) in the recycled material 66a in the form of a bubble, cavity or void. Blowing agents can be added in liquid, powder or pellet form. Typical addition levels range from approximately 0.1 to 5% (wt/wt)—based on the percent "active" azodicarbonamide. The addition level is preferably in a range of approximately 0.5–2.0% (or 0.25–1.0% active).

Other alternate chemical blowing agents include, but are not limited to, p-toluene sulfonyl semicarbizide or p,p oxybis benzene sulfonyl hydrazide(OBSH). The activation or decomposition rate of the blowing agent can be altered through the use of an activator. Suitable activators for azodicarbonamide blowing agents include, but are not limited to, transition metal salts, particularly those of lead, cadmium and zinc or organometallic complexes such as zinc oxides, zinc stearate, or barium stearate. Although dependent on the composition and activation characteristics of the blowing agent, activators are typically added at approximately a 1 to 1 ratio of activator to blowing agent.

Prior to or during extrusion, it is necessary to thoroughly mix the blowing agent and/or activator with the recycled material 66 or 66A and other additives in order to obtain a uniform dispersion. A uniform mixture is essential to ensure cells or gas pockets exist uniformly in the sheet. This in turn ensures that the resulting sheet will be of uniform thickness. In order to achieve a fine cell structure, it is preferred that fibrous material be removed from the recycled material or reduced to non-fibrous or powder-like proportions. Fibrous material may be removed from waste polymeric material through an elutriation process. It has been found, however, that a fine cell structure can be produced by cryogenic grinding of the densified pelletized material to form a fine powder, which is then mixed with the blowing agent in the feeder 55.

The melt temperature of the reduced density recycled material 66A in the extruder 50 is kept below the decomposition temperature of the blowing agent so that the blowing agent in the reduced density recycled material will not be activated during extrusion. After extrusion, the reduced density recycled material 66A, is conveyed by conveyor to the calender 61 where it is formed into a sheet.

Once a sheet is formed, the sheet is heated above the decomposition temperature of the blowing agent causing it to release gas and form cells or gas pockets 256 in the reduced density recycled material 66A. The cells 256 reduce the density and increase the thickness of the sheet. For example, at a blowing agent level of approximately 0.5% (0.25% active), a sheet made from reduced density recycled material 66A can reach a thickness after activation that is approximately 2 to 3 times its original thickness. A sheet produced from reduced density recycled material 66A is reduced in density from approximately 85 lbs/ft$^3$ at 35 mils thickness to approximately 27 lbs/ft$^3$ at 110 mils thickness. An ideal density for a commercial carpet backing ranges from approximately 18 lbs/ft$^3$ to 28 lbs/ft$^3$. The density chosen within this range is application specific. For example, in applications where considerable rolling traffic is prevalent a higher density in the upper end of the range is preferred.

In order for a carpet backing to be considered a cushion, it must be comprised of "cells" or air spaces 256. The cells 256 of the cushion must be intentional, individual, non-connecting and gas tight for the structure of the cushion to be considered closed-cell. Additionally, the cells 256 must be incorporated into a flexible polymer matrix. This structure provides a cushioning effect by allowing the carpet backing to compress under an external load and recover when the load is removed.

A reduced density recycled material 66A can also be achieved by the incorporation of other materials having a lower-density than recycled material 66 into the extruder 50 through the feeder 55. The incorporation of a recycled or waste material having a lower density would be desired due to the positive environmental impact. This may include, but is not limited to, materials having a lower density than the recycled material 66 such as ethylene vinyl acetate, polyethylene, wood flour and the shells of crustaceans having a chitinous or calcareous and chitinous exoskeleton. Lower density materials may include those that contain air such as coarsely ground thermoset foam, or hollow microspheres.

Another method that can be used to form a low density material involves the use of direct gas injection during the extrusion of the recycled material 66 or 66A. In this method supercritical carbon dioxide or other similar working fluid is injected into the material and allowed to expand immediately after extrusion to form a foamed sheet material.

After a sheet is formed from the recycled material 66 or the reduced density recycled material 66A, it can be fused by lamination to a carpet product to form a backing layer. In the case of the reduced density material 66A, this can be accomplished either before or after the sheet has been foamed through heat activation of the blowing agent. If the sheet is to be adhered to the carpet after foaming, the step of activating the blowing agent may be accomplished by heating the calendered sheet to the decomposition temperature. Alternatively, the sheet can be heated to the decomposition temperature substantially simultaneously with the calendering operation. Similarly, if the sheet is formed using a sheet die attachment on an extruder, the extruder can be operated at a temperature that causes the blowing agent to be activated during extrusion. After expansion is complete, the sheet is heat laminated to the back of the carpet product. As an alternative to an adhered backing, a foamed sheet formed from the recycled material 66 or the reduced density recycled material 66A could also be used as a separate pad or cushion for placement underneath carpeting.

The above methods can provide a suitable floor covering backing material. It has been found, however, that under certain conditions, it is difficult to maintain the dimensional stability of a free-standing foamed sheet during the expansion process. Therefore, in one embodiment of the present invention, a sheet formed from recycled material 66 or 66A and a blowing agent is adhered to a carpet back prior to activation of the blowing agent. This is accomplished by heating one side of the sheet to a temperature sufficient to adhere the sheet to the carpet but insufficient to activate the blowing agent. Alternatively, the sheet may be adhered to the carpet back immediately after forming as for example when a sheet die/extruder combination is used. The carpet with the sheet backing is then placed on a belt with the carpet face facing downward. It is then fed into an oven to heat the sheet backing to a temperature sufficient to decompose and activate the blowing agent. The backed carpet then passes out of the oven for cooling. Because the recycled backing sheet is adhered to the carpet, it tends to retain its dimensional stability during expansion and through the cooling process.

Figure 2:
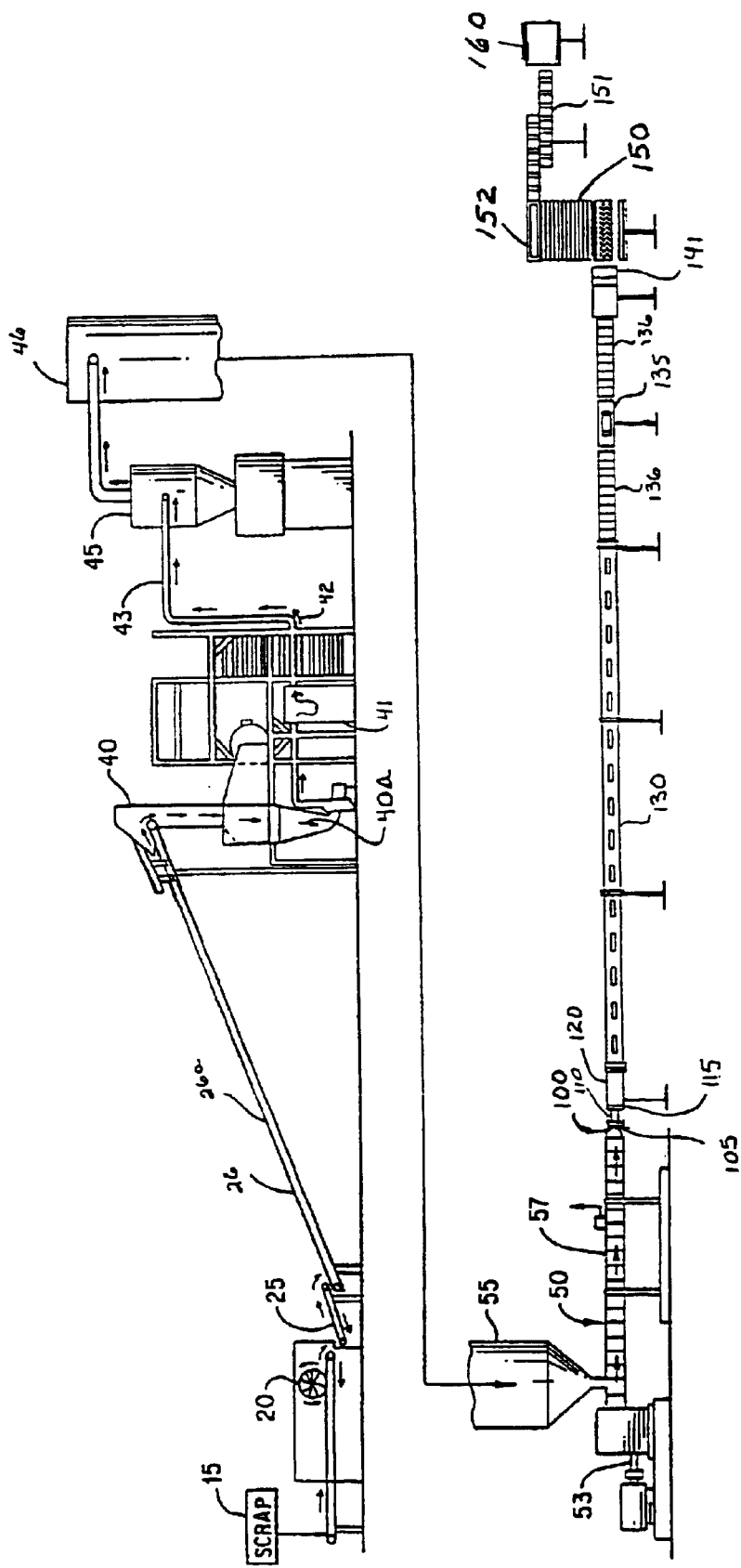
FIG. 2 is a diagrammatic view of a process for making products in accordance with the present invention by profile extrusion.
Figure 3:
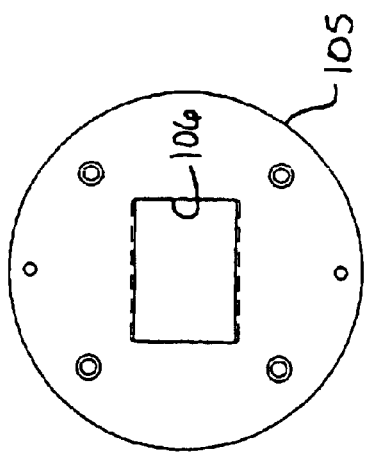
FIG. 3 is a front, plan view of a die exit plate of the profile extruder shown in FIG. 2.
Figure 4B:
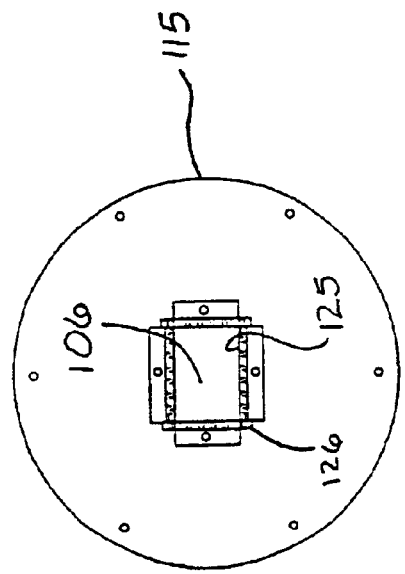
FIGS. 4a and 4b are side and front views of a sizing die used in the profile extruder shown in FIG. 2.
Figure 4A:
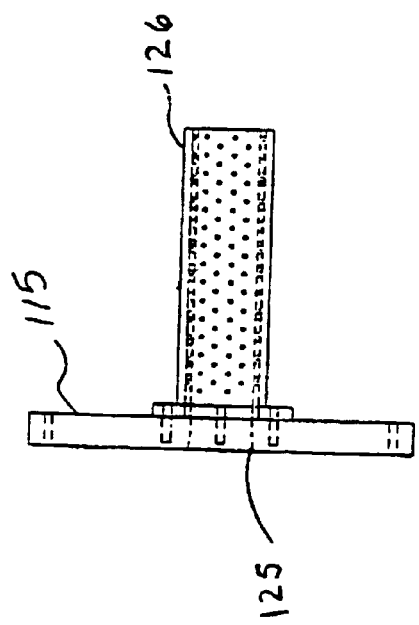

Referring now to FIGS. 2 and 3, an alternate embodiment of the process illustrated in FIG. 1 is shown wherein the extruder 50 has an extruder die 100 with a die exit plate 105 that has an opening with a rectangular shape 106, but can have different shapes, including, but not be limited to, a trapezoid shape, a square shape, circular or conical shapes, etc. The densified material 42 and/or the cryogenically ground material 42A is conveyed to the extruder 50 and exits the extruder 50 through the die exit plate 105 as an extruded blend 110 that has acquired the shape 106 of the die exit plate 105. The extruded blend 110 is pushed into a sizing die 115, shown in FIGS. 4a and 4b, located within a sizing cooling section 120 that may be connected to a water cooling section 130. The sizing die 115 is positioned adjacent to the die exit plate 105, but allows the extruded blend 110 to air cool prior to entering the sizing die 115. The sizing die 115 has an opening 125 with the same shape 106 as the opening in the die exit plate 105, and has an extension 126 that is approximately 18 inches long that also has the same shape 106 of the die, exit plate 105.

The extruded blend 110 travels through the sizing cooling section 120 into the water cooling section 130, which is approximately 60 feet long. At the far end of the water cooling section 130 is a conveyor pulling motor 135 that grips and pulls the extruded blend 110 through the water cooling section 130. Chilled water is circulated through the sizing cooling section 120 and the water cooling section 130. The chilled water enters the sizing cooling section 120 at approximately 38° F. and exits the water cooling section 130 at approximately 62° F. The water is then sent to a heat exchanger unit (not shown) for recooling the water before the water is recycled back into the sizing cooling section 120 and the water cooling section 130. The conveyor pulling motor 135 grips and pulls the extruded material 110 through the water cooling section 130 at a rate of approximately 4.8 feet per minute. The extruded material 110 enters the sizing cooling section 120 at a temperature of approximately 330° F. to 340° F., and exits the water cooling section 130 at a temperature of approximately 180° F. or less. By cooling the extruded blend 110 to 180° F. or less, the extruded blend 110 is able to maintain the shape 106 acquired from the die exit plate 105 and the sizing die 115.

Figure 5:
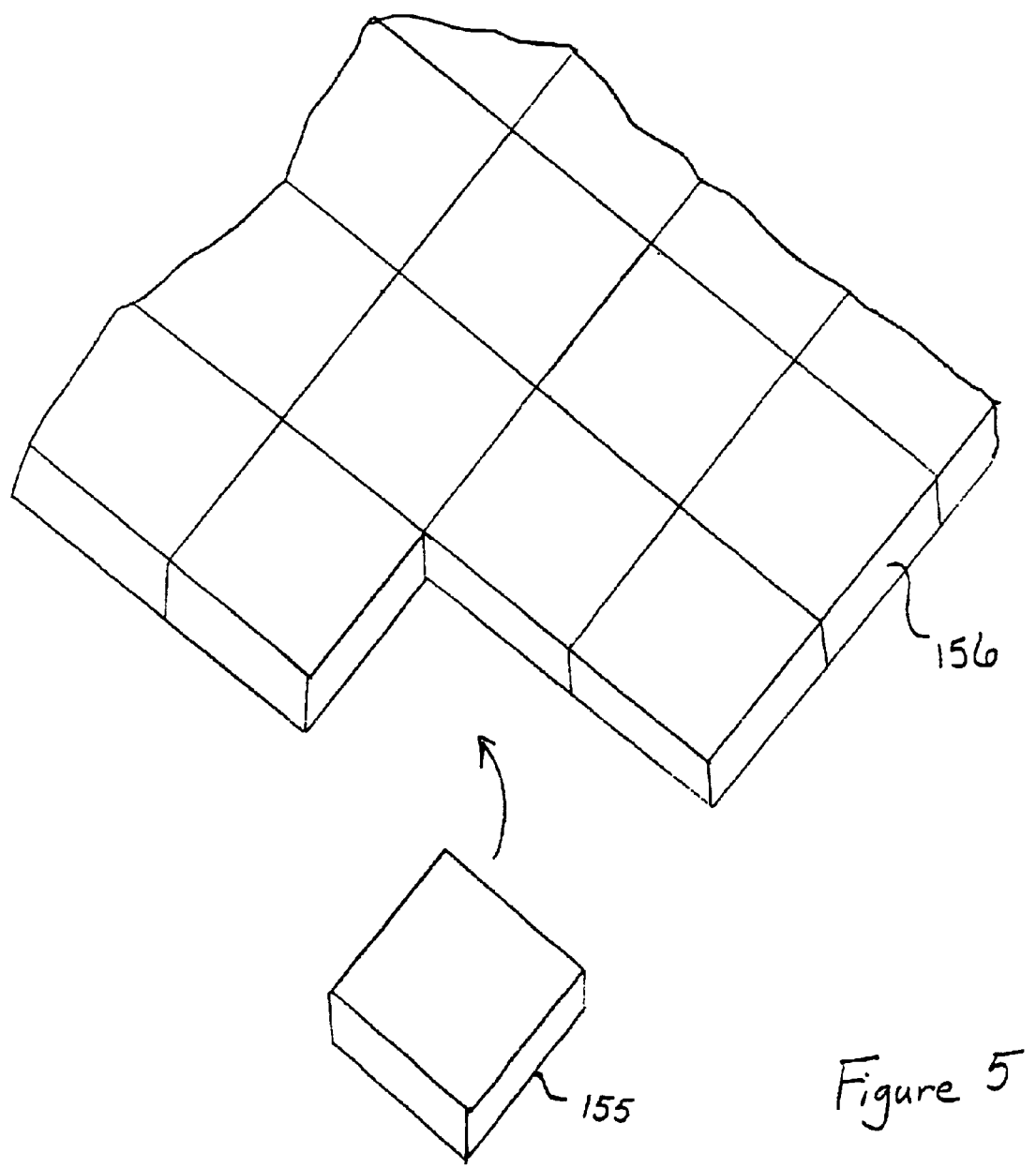
FIG. 5 is a perspective view of an industrial block flooring in accordance with the present invention.

The conveyor pulling motor 135 pulls and conveys the extruded blend 110 through the use of conveyors 136 into a rotating circular saw 141 that cuts the extruded blend 110 into pieces 150 which are approximately six feet in length that can be used as a building material. The pieces 150 can be conveyed through conveyors 151 to a planar saw 152 to adjust the acquired shape of the extruded blend 110. The pieces 150 are then conveyed to a stacking station 160 for stacking the pieces 150. The pieces 150 can then be cut into smaller pieces 155, as shown in FIG. 5, for use as building material that when connected together can form, for example, a block floor covering 156.

Alternatively, the pieces 150 can have holes 159 drilled into the ends of the pieces 150 at the drill press station (not shown) to form parking stop strips 165, as shown in FIG. 6, prior to being stacked. The pieces 150 can still be used as parking stop strips 165 without having any drilled holes 159.

Figure 7:
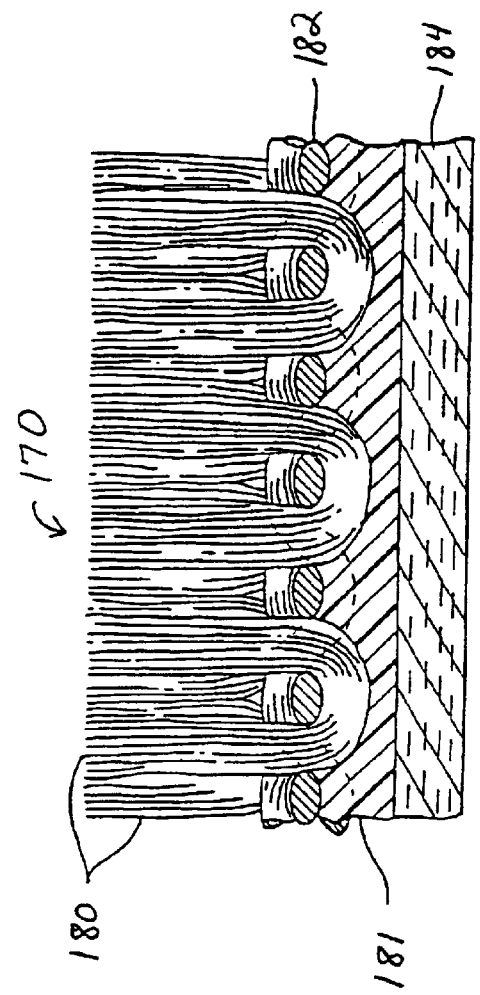
FIG. 7 is an enlarged cross-sectional view of a floor covering in accordance with the present invention.

Referring now to FIGS. 1 and 7, articles that can be made from the process described and illustrated in FIG. 1, include a floor covering 170 (e.g. a pile carpet or a mat). As shown in FIG. 7, tufted pile yarns 180 are looped through a primary backing 182, and extend upwardly therefrom. The backcoating 181 is an adhesive coating that fixes the pile yarns 180 in place in the primary backing 182. A secondary backing 184, which is made from the recycled material 66 or the reduced density recycled material 66A, is then adhered to the primary backing 182. This may be done using the backcoating 181 or another adhesive or by heat lamination. The primary backing 182 may be formed by weaving synthetic fibers, such as polypropylene, polyethylene, nylon, or polyester, for example, or may be a nonwoven construction utilizing one or more of these thermoplastic polymers. As is conventional, the pile yarns 180 may be cut to form cut pile tufts as illustrated in FIG. 7, or may form loops as shown in FIG. 8.

The backcoating 181 may be comprised of any suitable polymer compound. Typically, the backcoating 181 is comprised of either a polymer emulsion polymerization product or a polymer plastisol compound. The backcoating 181 is cured on the textile material by heating or drying or in any way reacting the backcoating 181 to cure, cross link or fuse it to the textile material. An exemplary emulsion polymerization product includes a polyvinylidene chloride or ethylene vinyl copolymer with at least one acrylic monomer. Standard acrylic monomers include, for example, acrylic acid, methyl acrylic acid, esters of these acids, or acrylonitrile. Alternatively, the backcoating 181 may comprise conventional thermoplastic polymers which are applied to the carpet by hot melt coating techniques known in the art.

To bond the secondary backing 184 to the backcoating 181, additional heat is applied to both the secondary backing 184 and the backcoating 181 before pressing the two layers together. The secondary backing 184 is contacted with the backcoating 181. The temperature is sufficient to partially melt the contacting surfaces of both the backcoating 181 and the secondary backing 184 thereby bonding the secondary backing 184 to the backcoating 181 forming an integral structure, such as described in U.S. Pat. Nos. 3,560,284 and 3,695,987 to Wisotzky, the disclosures of which are incorporated herein by reference in their entirety. As discussed above, the secondary backing 184 can be made from the reduced density resulting recycled material 66A, which provides for cushioned properties. If the reduced density secondary backing layer includes a blowing agent, the secondary backing layer may be adhered to the backcoating either before or after it has been expanded by activation of the blowing agent.

Figure 8:
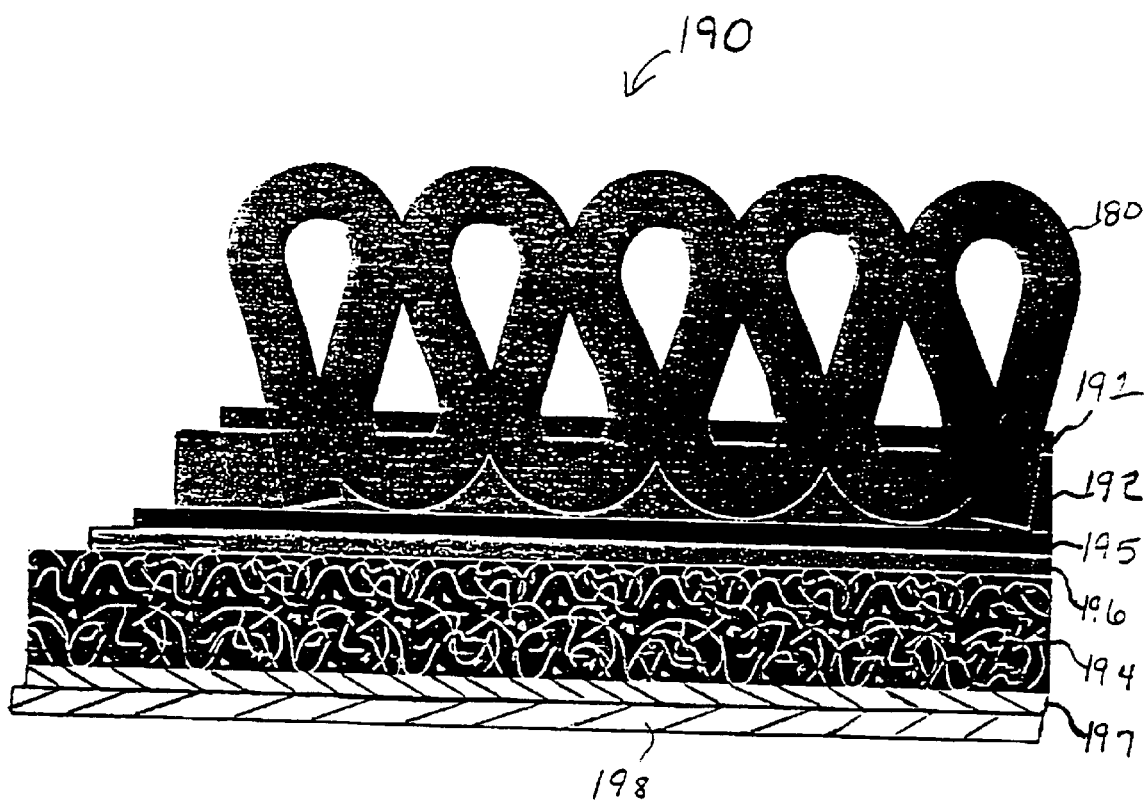
FIG. 8 is an enlarged cross-sectional view of an alternate embodiment of a floor covering in accordance with the present invention.

A second embodiment of a floor covering utilizing the resulting recycled material 66 is shown in FIG. 8. A floor covering 190, which may be formed in the shape of a tile or a mat, is shown having looped pile yarns 180 tufted or looped through a primary backing 191 and extending upwardly therefrom. As is conventional, the pile yarns 180 may be cut to form cut pile tufts as illustrated in FIG. 7. A backcoating 192, which is an adhesive coating, is used to fix the pile yarns 180 in place in the primary backing 191. A stabilizing reinforcement layer 195 and a fusion coat or plastisol adhesive layer 196 are located between the backcoating 192 and a secondary backing 194. The secondary backing 194 can be made from the resulting recycled material 66 or the reduced density recycled material 66A. The fusion coat or plastisol adhesive layer 196 and the secondary backing 194 are heated before being pressed together to form the floor covering 190. If a reduced density secondary backing layer including a blowing agent is used, the secondary backing layer may be adhered either before or after it has been expanded by activation of the blowing agent. Adhered onto the bottom surface of the secondary backing 194 is an aqueous, pressure sensitive oleophobic adhesive layer 197, as set forth in U.S. Pat. No. 4,849,267 for a Foam Backed Carpet with Adhesive Surface and Method of Installing Same, the disclosure of which is incorporated herein by reference in its entirety. The '267 patent is owned by the assignee of the present invention. It will be understood by those having ordinary skill in the art that other adhesives may also be used. A releasable cover or liner 198 may be removably attached to the adhesive layer 197.

Additionally, some carpet remnants, especially carpet tiles contain fiberglass reinforcement material. In recycling the carpet remnants and/or carpet tiles as scraps 15, the fiberglass, through the above-mentioned chopping and grinding process, is reduced to small pieces. The round, short, cylindrical pieces of fiberglass may plate out onto or be located on the surface allowing the possibility for release when handling the resulting recycled material 66. The oleophobic adhesive layer 197 encapsulates any fiberglass fibers on the surface of the resulting recycled material 66, now the secondary backing 194.

The oleophobic adhesive layer 197 also accelerates equilibrium of moisture regain in the hydrophillic components of the secondary backing 194. The extrusion process and/or the heating process results in a near bone dry condition of the hydrophillic components. The oleophobic adhesive layer 197 reintroduces moisture into the resulting recycled material 66, which is now the secondary backing 194. The forced drying of the oleophobic adhesive layer 197 once applied to the secondary backing 194 additionally improves the resulting stability of the floor covering 190. The use of an oleophobic adhesive layer 197 and releasable cover 198 can be applied to the secondary backing 184 of the floor covering 170. Also, the secondary backing 194 can be made from the recycled material 66A that has a reduced density layer which provides for cushioning properties. The floor coverings 170 and 190 can be formed in the shape of a tile.

Another embodiment of a floor covering utilizing the resulting recycled material 66 would be similar to that shown in FIG. 8, except that the layer 196 could be made directly from the resulting recycled material 66. This makes layer 196 now become the secondary backing layer and eliminates the need to have the backing layer 194. As previously discussed, the oleophobic adhesive layer 197, which would be placed against the layer 196, accelerates the equilibrium of moisture gain in the hydrophillic components of the resulting recycled material 66, which now is the layer 196.

Figure 9:
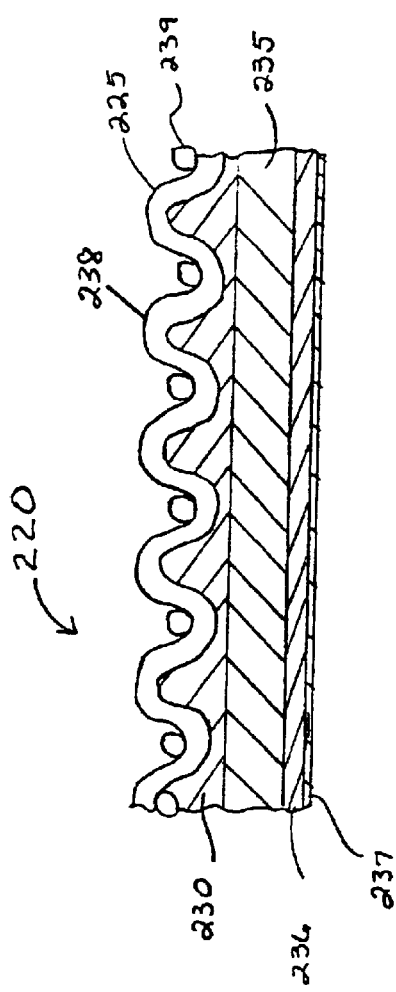
FIG. 9 is an enlarged cross-sectional view of a second alternate embodiment of a floor covering in accordance with the present invention.

Referring now to FIG. 9, a woven floor covering 220, which may be in the shape of a tile, is shown. The woven floor covering 220, as set forth in pending U.S. patent application Ser. No. 08/388,986, for Woven Floor Coverings, the disclosure of which is incorporated herein in its entirety, is shown having a woven carpet layer 225, a resin composition 230, a backing layer 235, and optionally a releasable oleophobic adhesive layer 236 with a releasable cover 237. The woven carpet layer 225 is formed by weaving warp yarns 238 and weft yarns 239 to provide a decorative face surface. The backing layer 235 can be made from the resulting recycling material 66. The oleophobic adhesive layer 236, as discussed above, is used to encapsulate fiberglass on the surface of the backing layer 235 and accelerate the equilibrium of moisture gain in the hydrophillic components of the resulting recycled material 66, which is now the backing layer 235.

Figure 10:
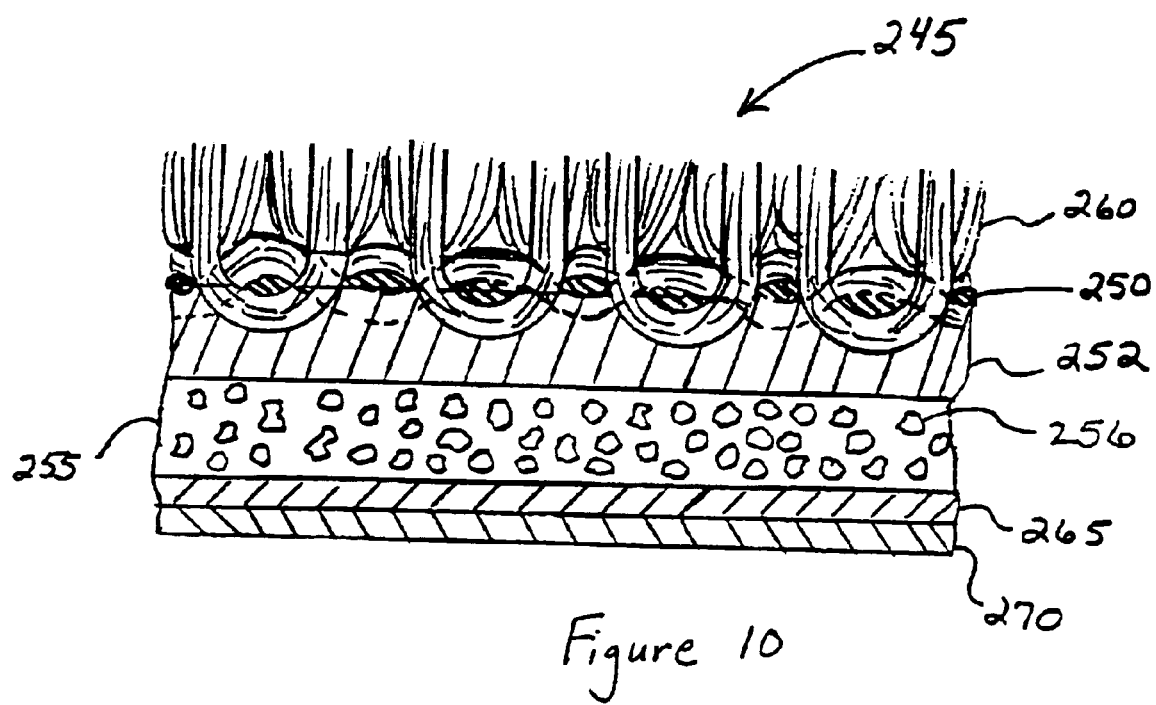
FIG. 10 is an enlarged cross-sectional view of a floor covering having a cushioned secondary backing in accordance with the present invention.

Referring now to FIG. 10, a cushioned floor covering 245 is shown. The cushioned floor covering may be in the shape of a tile or a rolled carpet. The cushioned floor covering 245 is shown having pile yarns 260 that are looped through a primary backing 250 and extending upwardly therefrom. The pile yarns 260 are then cut. Alternatively, the pile yarns 260 do not have to be cut, as shown in FIG. 8. A backcoating 252, which is an adhesive coating, fixes the pile yarns 260 in the primary backing 250. A secondary backing 255, which is made from the reduced density resulting recycled material 66A and provides for cushioning properties, is adhered to the primary backing 250 using the backcoating 252. If the recycled material 66A includes a blowing agent, the secondary backing may be adhered either before or after expansion due to activation of the blowing agent. The secondary backing 255 has air pockets or cavities 256 formed within the backing layer. An oleophobic adhesive layer 265 and a releasable cover 270 may be adhered to the secondary backing 255.

SUMMARY

The above-described processes and the articles utilizing the same provide for the recycling of waste polymeric material that can include from 0 to 40% aliphatic polyamide material and vinyl monomer and copolymer components. The waste material is granulated and densified wherein the chopped mixture is formed into pelletized fragments for extruding at a melt temperature range of approximately 300° to 380° F. Articles, such as floor coverings, can be made utilizing the recycled article of manufacture. The waste material may be mixed with a blowing agent prior to extrusion. Upon activation of the blowing agent, the material expands to provide a lower density article.

It is to be understood that while certain forms of this invention have been illustrated and described, the invention is not limited thereto, except insofar as such limitations are included in the following claims.

That which is claimed is:

1. A process for manufacturing a backing material for a floor covering comprising the steps of:
   chopping a mixture of waste polymeric material wherein the waste polymeric material has about 0.1 to 40 percent aliphatic polyamide material having a predetermined melting temperature;
   granulating the chopped mixture into fragments that are smaller than the original size of the waste polymeric material;
   densifying the granulated mixture into pelletized waste polymeric material;

mixing the waste polymeric material with a blowing agent having a predetermined decomposition temperature;

extruding the mixed waste polymeric material and blowing agent at a temperature less than the melting temperature of a majority of the aliphatic polyamide material and less than the decomposition temperature of the blowing agent to form an extrudate;

calendering the extrudate to form a backing sheet;

adhering the backing sheet to the floor covering; and heating the backing sheet to a temperature above the decomposition temperature of the blowing agent, thereby causing the backing sheet to expand to form a cushioned backing layer.

2. A process for manufacturing a backing material for a floor covering comprising:

granulating a mixture of waste polymeric material including from about 0.1 to about 40 percent aliphatic polyamide material into a granulated mixture of fragments at least an order of magnitude smaller than the original size of the waste polymeric material;

densifying the granulated mixture of waste polymeric material;

mixing the waste polymeric material with a blowing agent having a predetermined decomposition temperature;

forming a sheet from the mixture of waste polymeric material and blowing agent;

adhering the sheet to a back surface of the floor covering; and heating the sheet to a temperature above the decomposition temperature of the blowing agent, thereby causing the sheet to expand to form a cushioned backing layer, wherein the step of forming a sheet is carried out at temperatures below the melting temperature of a majority of the aliphatic polyamide material and below the decomposition temperature of the blowing agent.

3. A process for manufacturing a backing material according to claim 2 wherein the step of forming a sheet includes extruding the waste polymeric material at a temperature less than the melting temperature of a majority of the aliphatic polyamide material and less than the decomposition temperature of the blowing agent.

4. A process for manufacturing a backing material according to claim 2 wherein the step of forming a sheet includes calendering the waste polymeric material.

5. A process for manufacturing a backing material according to claim 2 further comprising cryogenically grinding the waste polymeric material.

6. A process for manufacturing a backing material according to claim 2 wherein the step of densifying the waste polymeric material includes forming the waste polymeric material into pellets.

7. A process for manufacturing a backing material for a floor covering comprising:

cryogenically grinding a mixture of waste polymeric material including from about 0.1 to about 40 percent aliphatic polyamide material;

densifying the granulated mixture of waste polymeric material;

mixing the waste polymeric material with a blowing agent having a predetermined decomposition temperature;

extruding the waste polymeric material at a temperature less than the melting temperature of a majority of the aliphatic polyamide material and less than the decomposition temperature of the blowing agent;

calendering the extruded waste polymeric material to form a sheet;

adhering the sheet to a back surface of the floor covering; and heating the sheet to a temperature above the decomposition temperature of the blowing agent, thereby causing the sheet to expand to form a cushioned backing layer.

8. A process for manufacturing a backing material for a floor covering comprising:

cryogenically grinding a mixture of waste polymeric material including from about 0.1 to about 40 percent aliphatic polyamide material to form a powder of waste polymeric material;

mixing the powder of waste polymeric material with a blowing agent having a predetermined decomposition temperature;

forming a sheet from the mixture of waste polymeric material and blowing agent;

adhering the sheet to a back surface of the floor covering; and heating the sheet to a temperature above the decomposition temperature of the blowing agent, thereby causing the sheet to expand to form a cushioned backing layer, wherein the step of forming a sheet is carried out at temperatures below the melting temperature of a majority of the aliphatic polyamide material and below the decomposition temperature of the blowing agent.

9. A process for manufacturing a backing material according to claim 8 wherein the step of forming a sheet includes extruding the mixture of waste polymeric material and blowing agent at a temperature less than the melting temperature of a majority of the aliphatic polyamide material and less than the decomposition temperature of the blowing agent.

10. A process for manufacturing a backing material according to claim 9 wherein the mixture of waste polymeric material and blowing agent is extruded through a sheet die.

11. A process for manufacturing a backing material according to claim 8 wherein the step of forming a sheet includes calendering the waste polymeric material.

12. A process for manufacturing a foamed backing material from waste polymeric material derived in part from recycled carpet the foamed backing material having a substantially uniform thickness, for a floor covering comprising:

granulating a mixture of waste polymeric material derived in part from recycled carpet including from about 0.1 to about 40 percent aliphatic polyamide material into a granulated mixture of fragments at least an order of magnitude smaller than the original size of the waste polymeric material;

densifying the granulated mixture of waste polymeric material;

mixing the waste polymeric material with a blowing agent having a predetermined decomposition temperature;

forming a sheet from the mixture of waste polymeric material and blowing agent;

heating the sheet to a temperature above the decomposition temperature of the blowing agent, thereby causing the sheet to expand to form a cushioned backing layer; and adhering the cushioned backing layer to a back surface of the floor covering, wherein the step of forming a sheet is carried out at temperatures below the melting temperature of a majority of the aliphatic polyamide material and below the decomposition temperature of the blowing agent.

13. A process for manufacturing a backing material according to claim 12 wherein the step of forming a sheet includes extruding the waste polymeric material at a temperature less than the melting temperature of a majority of the aliphatic polyamide material and less than the decomposition temperature of the blowing agent.

14. A process for manufacturing a backing material according to claim 12 wherein the step of forming a sheet includes calendering the waste polymeric material.

15. A process for manufacturing a backing material according to claim 12 further comprising cryogenically grinding the waste polymeric material.

16. A process for manufacturing a backing material according to claim 12 wherein the step of densifying the waste polymeric material includes forming the waste polymeric material into pellets.

17. A process for manufacturing a foamed backing material from waste polymeric material derived in part from recycled carpet, the foamed backing material having a substantially uniform thickness, for a floor covering comprising:

cryogenically grinding a mixture of waste polymeric material derived in part from recycled carpet including from about 0.1 to about 40 percent aliphatic polyamide material;

densifying the granulated mixture of waste polymeric material;

mixing the waste polymeric material with a blowing agent having a predetermined decomposition temperature;

extruding the waste polymeric material at a temperature less than the melting temperature of a majority of the aliphatic polyamide material and less than the decomposition temperature of the blowing agent;

calendering the extruded waste polymeric material to form a sheet;

heating the sheet to a temperature above the decomposition temperature of the blowing agent, thereby causing the sheet to expand to form a cushioned backing layer; and adhering the cushioned backing layer to a back surface of the floor covering.

18. A process for manufacturing a foamed backing material from waste polymeric material derived in part from recycled carpet, the foamed backing material having a substantially uniform thickness, for a floor covering comprising:

cryogenically grinding a mixture of waste polymeric material derived in part from recycled carpet including from about 0.1 to about 40 percent aliphatic polyamide material to form a powder of waste polymeric material;

mixing the powder of waste polymeric material with a blowing agent having a predetermined decomposition temperature;

forming a sheet from the mixture of waste polymeric material and blowing agent; and heating the sheet to a temperature above the decomposition temperature of the blowing agent, thereby causing the sheet to expand to form a cushioned backing, wherein the step of forming a sheet is carried out at temperatures below the melting temperature of a majority of the aliphatic polyamide material and below the decomposition temperature of the blowing agent.

19. A process for manufacturing a backing material according to claim 18 wherein the step of forming a sheet includes extruding the mixture of waste polymeric material and blowing agent at a temperature less than the decomposition temperature of the blowing agent to form a sheet.

20. A process for manufacturing a backing material according to claim 19 wherein the mixture of waste polymeric material and blowing agent is extruded through a sheet die.

21. A process for manufacturing a backing material according to claim 18 wherein the step of forming a sheet includes calendering the waste polymeric material.

* * * * *

UNITED STATES PATENT AND TRADEMARK OFFICE
CERTIFICATE OF CORRECTION

PATENT NO. : 6,860,953 B1 Page 1 of 1
DATED : March 1, 2005
INVENTOR(S) : Grizzle et al.

It is certified that error appears in the above-identified patent and that said Letters Patent is hereby corrected as shown below:

Title page,
Item [63], Related U.S. Application Data, should read
-- Continuation-in-part of application No. 09/039,913, filed on Mar. 16, 1998, now abandoned, which is a continuation-in-part of application No. 08/826,431, filed on Mar. 18, 1997, now Pat. No. 5,855,981, which is a continuation of application No. 08/517,230, filed on Aug. 21, 1995, now abandoned, which is a continuation of application No. 08/193,801, filed on Feb. 9, 1994, now abandoned. --.

Signed and Sealed this

Twenty-fourth Day of May, 2005

JON W. DUDAS
*Director of the United States Patent and Trademark Office*